United States Patent [19]

Braun et al.

[11] 4,111,135
[45] Sep. 5, 1978

[54] PLANTING MACHINE

[75] Inventors: Leonard Charles Braun, Bartlett; Edward Leonard Benno, Grayslake, both of Ill.

[73] Assignee: Illinois Tool Works Inc., Chicago, Ill.

[21] Appl. No.: 700,270

[22] Filed: Jun. 28, 1976

[51] Int. Cl.² .......................... A01C 11/00; A01C 5/02
[52] U.S. Cl. ............................................ 111/2; 111/89; 111/91
[58] Field of Search ........................ 111/1–4, 111/7.4, 89–93, 96; 47/48.5, 73

[56] References Cited

U.S. PATENT DOCUMENTS

| | | | |
|---|---|---|---|
| 1,252,128 | 1/1918 | McCallum | 111/91 X |
| 1,871,529 | 8/1932 | Karshner | 111/89 |
| 2,009,785 | 7/1935 | Pomierance | 111/3 |
| 2,193,779 | 3/1940 | Ramsden et al. | 111/89 X |
| 2,789,522 | 4/1957 | Barton | 111/89 |
| 2,806,324 | 9/1957 | Ruth et al. | 111/89 X |
| 3,113,534 | 12/1963 | Wessel | 111/89 |
| 3,306,239 | 2/1967 | Martin, Jr. | 111/3 X |
| 3,517,629 | 6/1970 | Bridges et al. | 111/4 X |
| 3,705,559 | 12/1972 | Okorokov et al. | 111/3 |
| 3,815,524 | 6/1974 | Poll | 111/2 |
| 3,872,805 | 3/1975 | Kolk | 111/2 |

FOREIGN PATENT DOCUMENTS

| | | | |
|---|---|---|---|
| 694,803 | 9/1964 | Canada | 111/4 |
| 957,207 | 11/1974 | Canada | 47/73 |
| 612,781 | 4/1935 | Fed. Rep. of Germany | 111/91 |
| 654,620 | 12/1937 | Fed. Rep. of Germany | 111/2 |
| 354,982 | 2/1921 | Fed. Rep. of Germany | 111/89 |
| 50,020 | 1/1932 | Norway | 111/89 |
| 127,499 | 5/1959 | U.S.S.R. | 111/2 |

*Primary Examiner*—Edgar S. Burr
*Assistant Examiner*—James R. Feyrer
*Attorney, Agent, or Firm*—Robert W. Beart; Edward L. Benno

[57] ABSTRACT

A planting machine for inserting plants, such as seedlings which have been grown in a cartridge, to a substantial depth in the open ground and substantially absent of any plowing or rocking effect on the plant during the planting operation and while the machine is moving along the ground. In a preferred embodiment the machine comprises a frame which is supported for movement along the surface of the ground. The frame carries a planting mechanism, an operator and a supply of seedling cartridges. The planting mechanism is driven by a ground wheel and is so arranged that as a plant is inserted into the ground to a substantial depth while the machine is moving along the ground, the plant is free of any horizontally directed component of force which may tend to produce an elongated opening in the ground. In a preferred embodiment shown and described, that result is achieved by the use of a parallelogram arrangement which carries the plant with the effective arms of the parallelogram set to produce a minimum horizontal component of movement relative to the ground as the planting mechanism is driven by the ground wheel. Further, the plant is carried on a roller assembly in the parallelogram arrangement so that when the plant begins to enter the ground in the planting operation, the roller assembly can horizontally translate on the parallelogram arrangement to produce substantially no horizontal component of movement of the plant relative to the ground during the planting operation. The machine further includes a set of water nozzles from which water under pressure issues after each planting operation to effectively water-tamp each plant that has been inserted into the ground.

1 Claim, 8 Drawing Figures

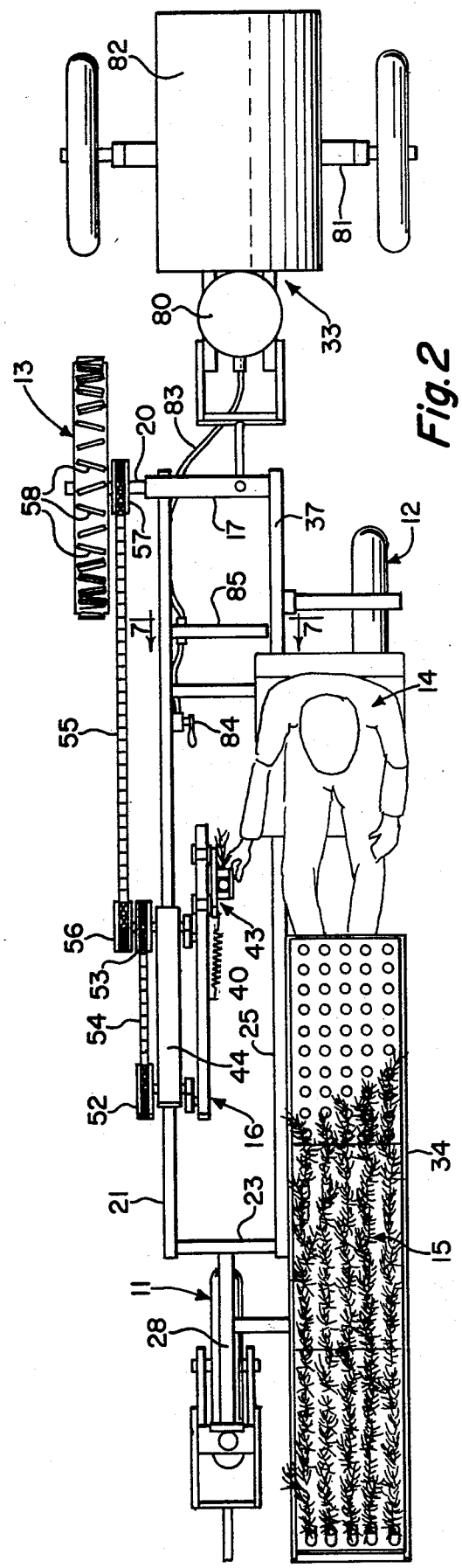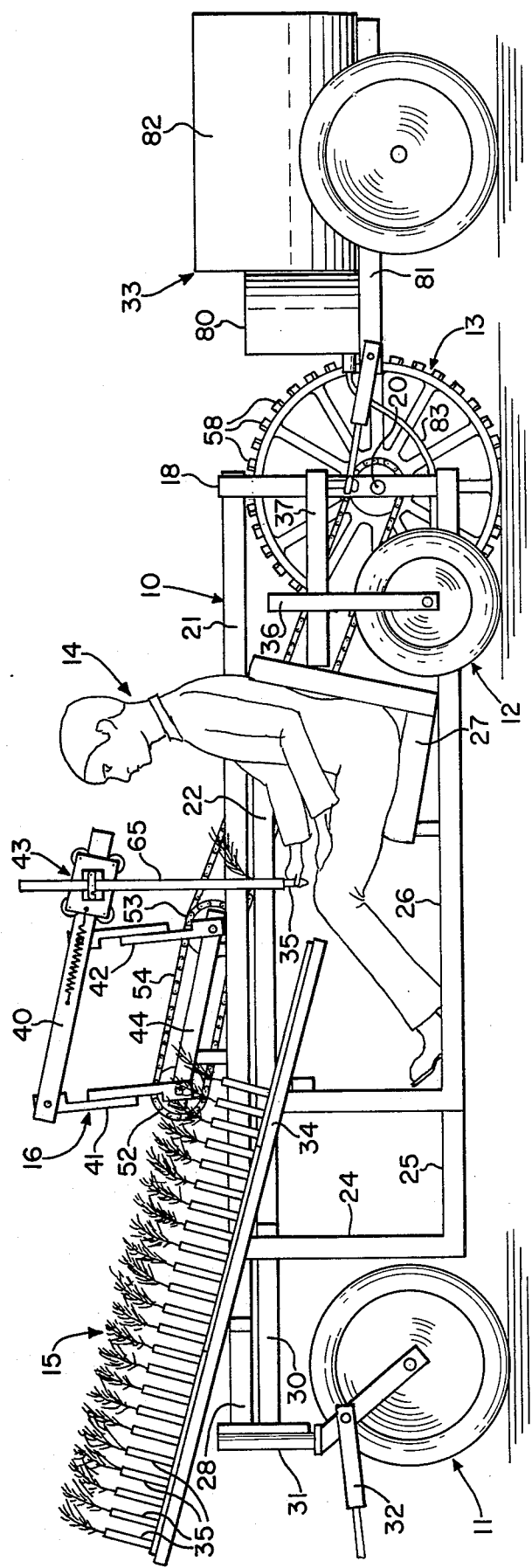

PLANTING MACHINE

BACKGROUND OF THE INVENTION

The subject invention relates to planting machines which will plant individual growing plants such as seedlings which have been grown to the seedling stage from seed in a greenhouse and are ready for out-planting in some pattern of parallel rows with a predetermined spacing between each of the plants in each row. The invention is further concerned partially with plants that must be planted to a considerable depth in the open ground, plants for example such as conifer seedlings having a root area that is at least 6 inches in length.

The most common prior art machines for such out-plantings generally involve a furrow opening plow preceding a person supported above the furrow, who deposits plants in the opened furrow, and with some furrow closing or tamping means following thereafter to complete the plantings. Some further prior machines include automatic means for depositing individual plants through a plant holding mechanism into the opened furrow. A number of other prior art machines do not require the openings of a furrow for reception of the plant, but are intended to insert a plant or cartridge by either opening a hole, dropping the plant therein and reclosing the hole about the plant or by pushing the seedling in a cartridge into the ground. A number of the prior art machines which simply inject a plant or cartridge into the ground use a ground wheel drive to operate the planting mechanism.

It appears that in prior art ground wheel controlled or driven machines which do not first open a furrow, but which simply inject the plant, that the specific cyclical motion produced by the ground wheel drive is disregarded with the result that the planting tool in entering and retracting from the ground plows or opens a hole substantially larger than the plant thereby requiring substantial tamping or replacement of soil about the inserted plant.

SUMMARY OF THE INVENTION

As opposed to known prior art devices, the machine of the subject invention, using a ground wheel control or drive, inserts a plant or seedling cartridge in a substantially vertical direction into the ground to a substantial depth without forming any planting hole in the ground larger than the tool that inserts the plant or cartridge. Thus, any required tamping or closing of the soil about the plant is a minimum.

A machine of the subject invention in one preferred embodiment accomplishes the foregoing by using a parallelogram mechanism driven by a ground wheel in which the effective radius of the rotating arms of the parallelogram are so related to the rolling radius of the ground wheel that a point on the parallelogram member which supports the plant holder traces the curve of a prolate trochoid in which the length of the closed loop of the traced prolate trochoid is substantially equal to the length of the root structure of the plant or cartridge to be planted, and with the width of the closed loop of the traced prolate trochoid curve a minimum relative to the planting depth. In that arrangement, the plowing effect in planting to substantial depths in considerably reduced compared to that occurring in known prior art machines.

Further, the plant holder is movably mounted on the parallelogram member so that when the tip of the planting tool, which is carried on the plant holder, enters the ground, the tool and holder will remain stationary relative to any horizontal direction of movement, and the tool will be vertically moved into and out of the ground in the planting operation. During the planting operation the holder will be horizontally translated on the parallelogram member an incremental distance substantially equal to the width of the closed loop of the traced prolate trochoid curve. The invention contemplates that other structures that are ground controlled in their operation may be used to provide that the plant will be devoid of any horizontal component of movement while it is held vertically and planted to a substantial depth into the ground and while the machine is continuously moving along the ground.

The planting tool which is carried on the holder is, in the embodiment shown and described in the drawings, adapted to receive a seedling cartridge such as shown in the U.S. patent application of Bryant Edwards, Ser. No. 670,918, filed Mar. 26, 1976. The seedling cartridges of the Edwards' application comprise a base, the underside of which in some preferred embodiments is formed with a bullet-nosed configuration, and a frame and sleeve on the upper side of the base that supports the roots and growing medium of a plant that has been grown in the cartridge. The cartridge absent the sleeve is intended to be planted in the ground and left therein for the further growth of the plant. Such cartridges, and particularly when used for growing conifers, have a relatively small diameter and a relatively long length, for example, in a ratio of 1 to 6. Because of its length, such a cartridge requires relatively deep insertion into the ground, and, if the tap and lateral roots of the plant are to grow well after transplanting, it is important that the soil about the frame be in firm contact with the seedling roots after out-planting.

An important feature of the present invention is that such a relatively long and narrow cartridge can be planted or inserted into the ground with a minimum disturbance of the ground about the cartridge. Upon extraction of the planting tool from the ground, leaving the planted cartridge, the maximum horizontal distance between the root structure and the surrounding undisturbed ground is substantially the wall thickness of the planting tool. That distance is so small that substantial soil replacing or packing elements are not necessary to place the root structure in contact with the adjoining soil. In one embodiment of the invention, a simple pair of water nozzles is used to effectively water-tamp the planted cartridge. Because of the small annular space around the planted cartridge, the water nozzles can easily wash a small amount of soil from the top of the ground about the planted cartridge into the small annular space about the planted cartridge to effectively complete the planting.

Other objects and features of the invention will be apparent upon a perusal of the hereinafter following detailed description read in conjunction with the drawings.

Brief Description of the Drawings

FIG. 1 is a side elevational view of one embodiment of a machine of the subject invention;

FIG. 2 is a top plan view of the machine of FIG. 1;

Detailed Description of a Preferred Embodiment

Figure 4:
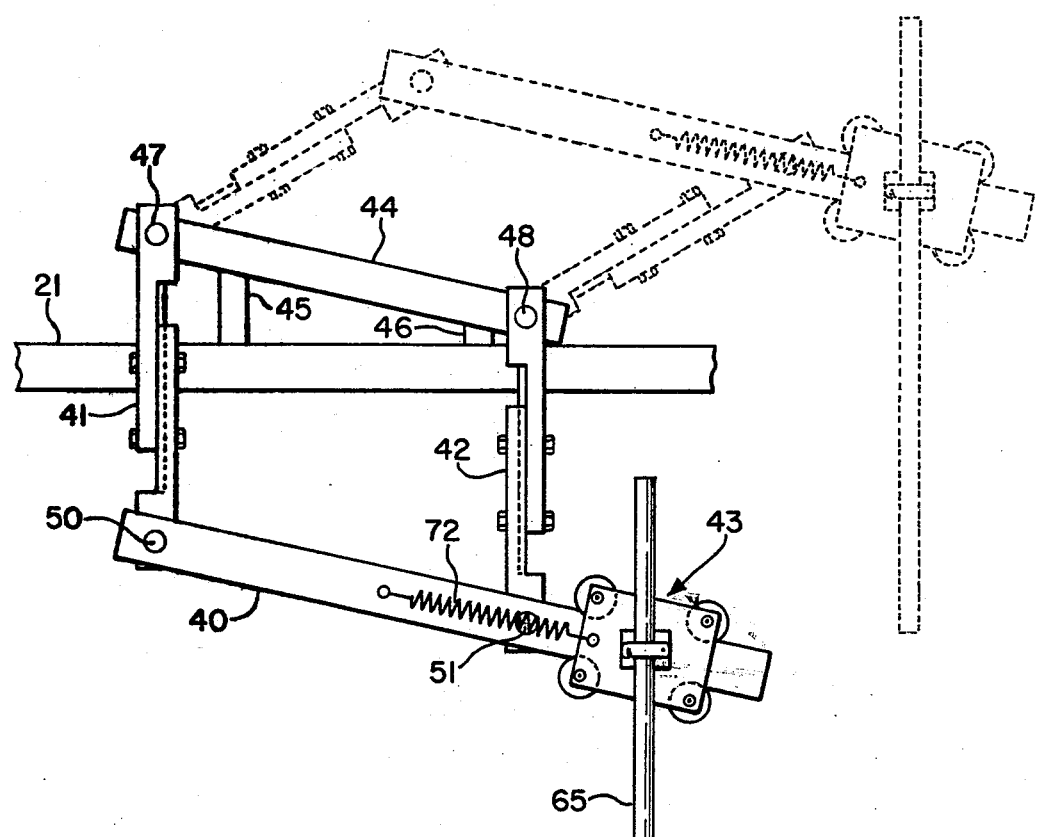
FIG. 4 is a view similar to FIG. 3, but further showing in solid line and in dotted line two other operated positions of the parallelogram members and the plant holder.

As shown in FIGS. 1 and 2, the machine comprises a frame member 10 supported for movement along the ground by wheels 11, 12 and 13. The frame carries a person 14, a supply of seedling cells or cartridges 15 and the planting mechanism 16.

The frame 10 comprises a number of tubular steel members conveniently welded together as a unitary assembly to provide the needed support for the various elements of the machine. Horizontal members such as member 17 in FIG. 2 and vertical members such as member 18 in FIG. 1 are provided for support of the axle 20 of the wheel 13. Horizontal members 21 and 22 support the planter mechanism 16. A transverse support member 23 connected to the forward end of member 21, and a second transverse support member immediately therebelow connected to support member 23 are connected to the upper end of a vertical member 24 which in turn at its lower end is connected to a further horizontal member 25. The horizontal support member 25 and the horizontal support member 26 extend toward the rear of the machine and are thereat further connected to transverse and vertical support members connected primarily to the support member 21 for supporting the seat 27 upon which the person 14 sits. Support members 28 and 30 are connected at the front end of the machine to the support member 23 and the member therebelow. Support members 28 and 30 are further connected to the fork structure 31 for the forward caster wheel 11. A towing fork 32 is connected to the fork 31 for the caster wheel 11 to enable the machine to be towed by a tractor (not shown). Although the embodiment shown and described is adapted for use with a towing vehicle, it should be understood that the machine may also be pushed by a tractor connected to the rearward end of the planting machine. In a situation where the machine is pushed, the water tamping assembly 33, shown as being towed by the planting machine, may be conveniently mounted on the pushing tractor or vehicle. The invention further contemplates that the planting machine may be arranged with its own engine to avoid the need for a towing or pushing vehicle. Of course, it should be understood that when the machine is so equipped, a steering mechanism must be connected to the forward wheel 11 to enable the operator to steer the machine as it propels itself over the surface of the ground.

The frame members of the frame 10 at the forward end of the machine are also conveniently used to carry an elongated tray 34 for the supply of cartridges 15. The tray 34 is aligned longitudinally of the machine and is inclined downwardly and rearwardly of the machine toward the operator 14. The tray 34 carries a plurality of cartridge trays which support the individual seedling cartridges 35.

The third wheel 12 in cooperation with the forward wheel 11 and the ground drive wheel 13 provides a tricycle type wheel arrangement for the machine. The wheel 12 is carried in a support assembly 36 secured to a frame member 37 immediately rearwardly of the seat 27. Those skilled in the art will understand that other wheel and frame arrangements may be made for supporting the essential elements of the machine in proper cooperating relationships.

The planting mechanism 16 comprises three members 40, 41 and 42 and a plant holder 43. The members 40, 41 and 42 are rotatably interconnected to define a parallelogram with the rotatable connections of the members 41 and 42 on the frame 10. In a preferred arrangement a fixed member 44 is mounted on spacer blocks 45 and 46, which in turn are mounted on the frame member 21. The fixed member 44 is inclined relative to the substantially horizontal frame member 21 in a direction upwardly and forwardly relative to the forward end of the machine. Member 41 is rotatably mounted at one end thereof on the forward upper end of the fixed member 44 by a bearing pin assembly 47. One end of member 42 is rotatably mounted on the lower rearward end of the fixed member 44 by a bearing pin assembly 48. The other end of member 41 is pivotally mounted to one end of the member 40 by a bearing pin 50. The other end of the member 42 is rotatably mounted to the member 40 intermediate the ends thereof by a bearing pin 51. The distance between the axes of the bearing pins 50 and 51 is substantially the same as the distance between the axes of the bearing pins 47 and 48. The distance between the axes of the bearing pins 47 and 50 is the same as the distance between the axes of the bearing pins 48 and 51. In a preferred form as shown in the drawings, the members 41 and 42 are adjustable in length to provide the desired geometric relationship with the effective radius of the ground drive wheel 13. In order that the member 40 in the parallelogram defined by the axes of rotation of the members 40, 41 and 42 be rotatable through a complete circle, the members 41 and 42 are mounted inboard of the member 44, and the member 40 is mounted inboard of the members 41 and 42.

To rotate the member 40 in the defined parallelogram, a sprocket wheel 52 is drivingly secured to the outboard end of the bearing pin 47, and a sprocket wheel 53 is drivingly connected to the outboard side of bearing pin 48. A roller chain 54 is mounted about the two sprocket wheels 52 and 53 to provide a common drive to both of the bearing pins 47 and 48. The sprocket wheels 52 and 53 are rotatably driven by a roller chain 55 extended from the ground drive wheel 13. The roller chain 55 drivingly engages a sprocket wheel 56 secured to the outboard end of the bearing pin 48, and is driven by a sprocket wheel 57 connected to the ground wheel 13 and journaled on the axle 20. Known roller chain tighteners (not shown) are preferably mounted on the roller chains 54 and 55 to remove any unnecessary slack in those chains. The ground drive wheel 13 may be of any suitable form that will positively rotate as the machine is moved over the surface of the ground. For example, the ground drive wheel 13 may be a wheel having a steel rim with radially extending ground penetrating lugs, such as lugs 58. From the foregoing it may be seen that as the machine is moved over the surface of the ground, the ground drive wheel 13 and the sprocket wheel 57 secured thereto will be rotated to drive the roller chain 55 to in turn drive the sprocket wheels 56, 53 and through the roller chain 54 the sprocket wheel 52. Rotation of the sprocket wheels 52 and 53 will cause rotation of the bearing pins 47 and 48 to thereby cause rotation of the members 41 and 42 in a counterclockwise direction as viewed in FIGS. 1, 3 and 4.

In a reduction to practice of the invention, a ground drive wheel 13 having an effective radius of about 15 inches was selected. That wheel had an effective circumference of substantially 94 inches or approximately 8 feet. The sprocket wheels 56 and 57 were of the same diameter to produce one complete rotation of the defined parallelogram for every rotation of the ground drive wheel 13 to produce a planting pattern of approximately 8 feet between plants which is a suitable spacing for plants such as conifer seedlings.

The distances between the axes of rotation of the pins 48 and 51 and between the axes of rotation of the pins 47 and 50 are such that a point on the member 40 will trace the curve of a prolate trochoid as the machine is moved along the surface of the ground. Equations for the geometric curve known as a trochoid are well-known and need not be set out herein. Briefly, a trochoid curve may be defined as that curve traced by any point on a radial line of a circle rolling on a straight line where the point is at some distance $b$ from the center of the rolling circle. If the distance $b$ is equal to the radius of the rolling circle, the curve produced is commonly called a cycloid. If the distance $b$ is greater than the radius of the rolling circle, the curve is commonly called a prolate trochoid, while if the distance $b$ is less than the radius of the circle, the curve is commonly called a curtate trochoid. Thus, in the machine of the subject invention, the distance between the axes of the pins 48 and 51 is greater than the effective radius of the ground drive wheel 13. In the noted reduction to practice of the subject invention, the distance between the axes of the bearing pins 48 and 51 was set at 17.875 inches, and with the ground drive wheel having the noted effective radius of approximately 15 inches, any point on the member 40 traced the curve of a prolate trochoid as the machine moved along the ground, the closed loop portion of which is shown as curve 60 in FIG. 8. The importance of the curve 60 in the machine of the invention will be described hereinafter.

Figure 6:
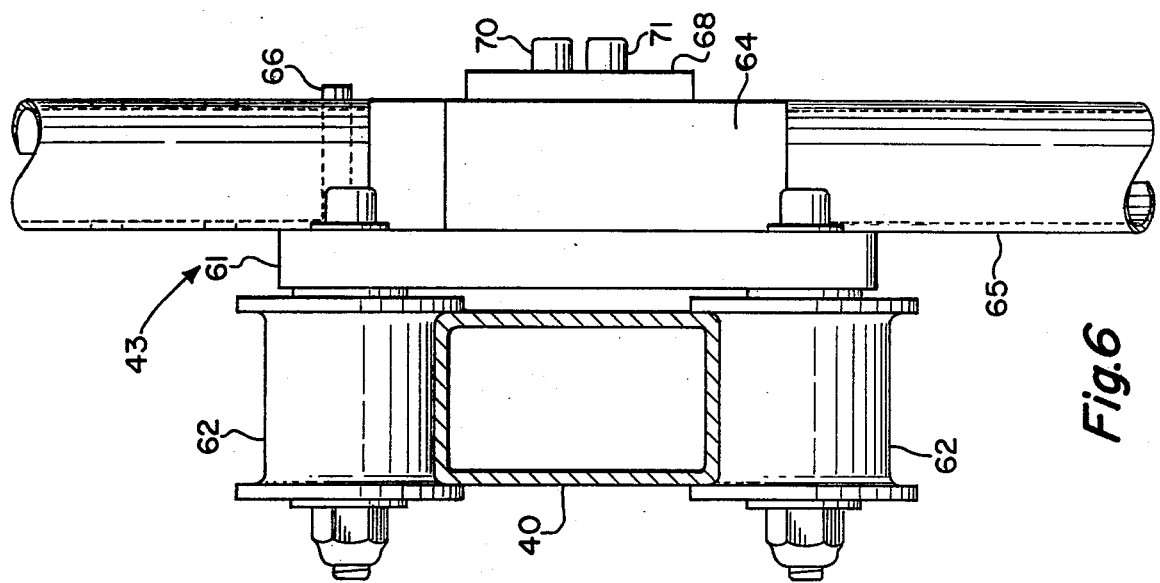
FIG. 6 is a side elevational view of the structure shown in FIG. 5 and taken substantially along the line 6—6 of FIG. 5.
Figure 5:
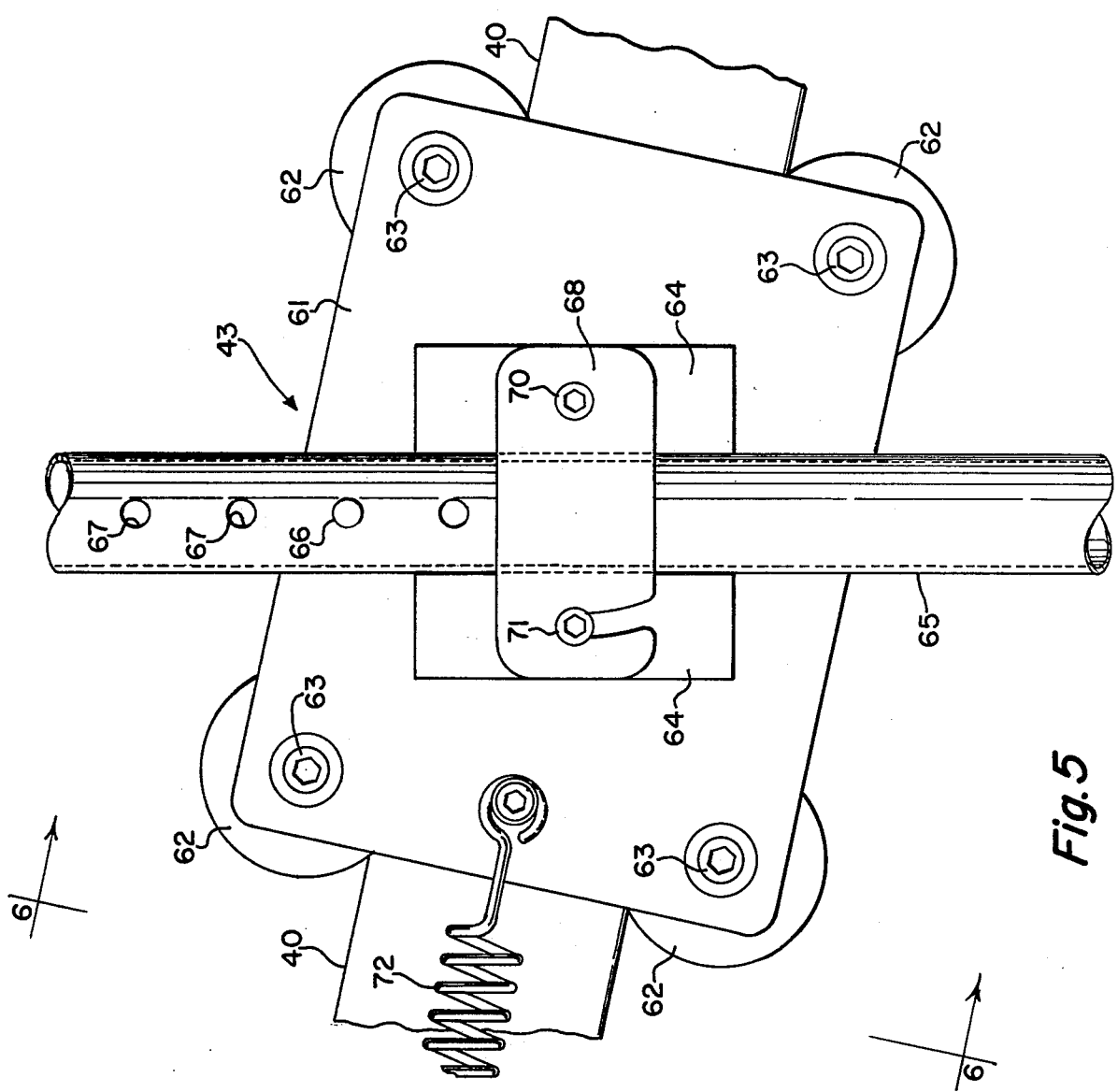
FIG. 5 is an enlarged side elevational view of the plant holder as shown in FIGS. 1-4.

Further, the plant holder 43 is movably carried on the member 40 and is constructed substantially as shown in enlarged detail in FIGS. 5 and 6. Plant holder 43 comprises a plate 61 and four shaped rollers 62. Each of the rollers 62 is rotatably supported on one side of the plate 61 adjacent one of its corners by a bearing pin 63. The rollers 62 in pairs are spaced-apart a distance sufficient to rollingly engage the upper and lower sides of the member 40 substantially as shown in FIGS. 5 and 6. Each of the rollers 62 is shaped to include portions of the sidewalls of the member 40 to prevent lateral displacement of the plate 61 and the rollers 62 from the member 40. The plant holder 43 further includes a pair of blocks 64 mounted on the inboard side of the plate 61. The blocks 64 are spaced-apart a distance substantially equal to the outer diameter of the planting tool 65, and further extend outwardly of the plate 61 a distance substantially equal to the outer diameter of the planting tool 65. The planting tool 65 is a substantially tubular member and is carried between the blocks 64 against the plate 61 substantially as shown. The blocks 64 are further positioned on the plate 61 so that the longitudinal axis of the planting tool 65 is disposed substantially perpendicular to the ground line of the machine.

The planting tool 65 is adjustably fixed against movement along its longitudinal axis relative to the plate 61 by a fixed pin 66 secured to the plate 61 and extending outwardly therefrom through one of the transverse holes 67 in the planting tool 65. The planting tool 65 is fixed against lateral movement out of the blocks 64 by a locking plate 68. The locking plate 68 is rotatably mounted at one end thereof on one of the blocks 64 by a pin 70. The other end of the locking plate 68 is slotted to engage a headed bolt 71 to lock the planting tool 65 between the blocks 64.

From the foregoing it may be seen that if the plant holder 43 is fixed against movement along the member 40, any point on the planting tool 65 will trace the curve of the prolate trochoid described above. However, the described movable arrangement of the plant holder 43 on the member 40 permits movement of the plant holder 43 along the member 40 for a reason to be described hereinafter. The plant holder 43 is spring biased to a normal centered position on the extending rearward end of the member 40 by a coiled spring 72. One end of the coiled spring 72 is fastened to the member 40 and the other end of that spring is secured to the plate 61.

Figure 3:
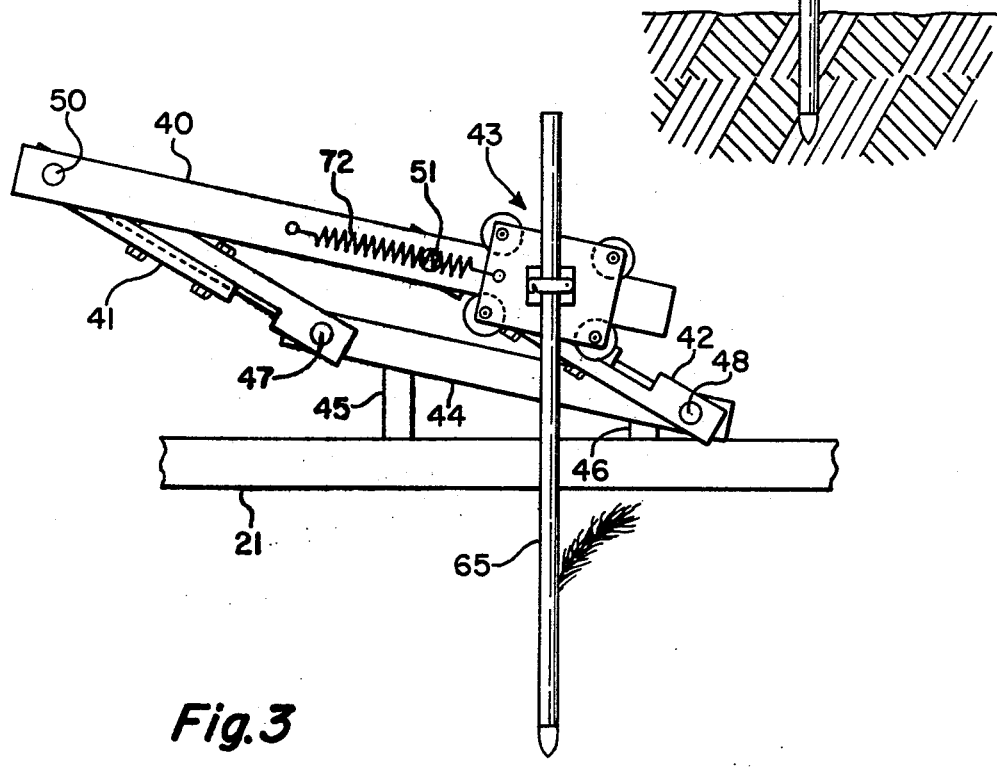
FIG. 3 is an enlarged side elevational view of the parallelogram members and plant holder of FIG. 1, but with the parallelogram members having been rotated further in a counterclockwise direction as viewed in FIG. 3 from the position shown in FIG. 1.
Figure 7:
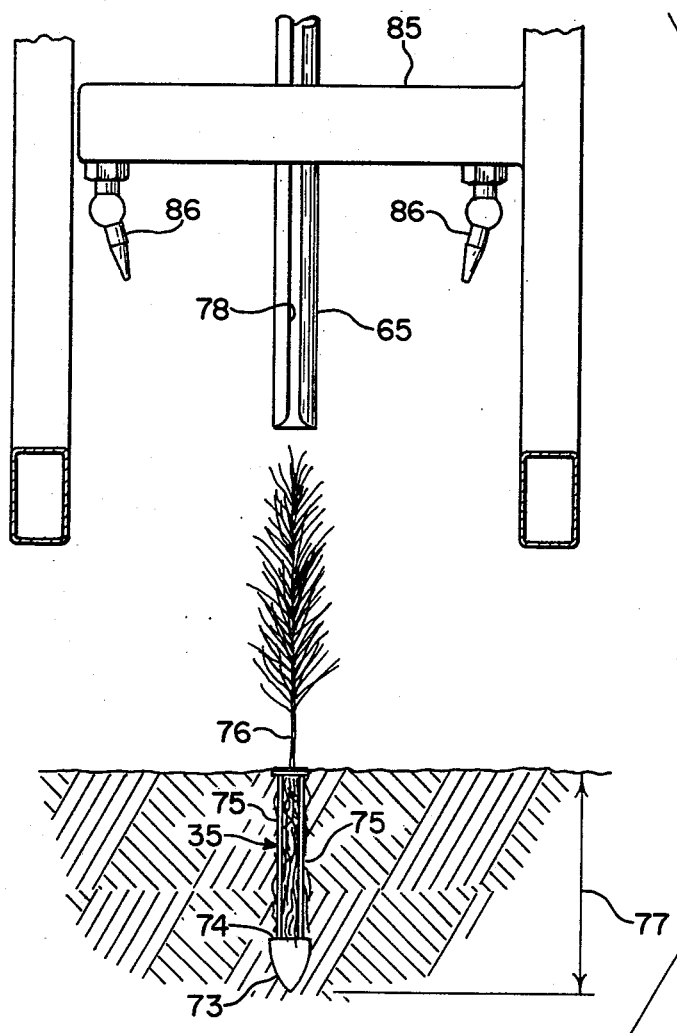
FIG. 7 is an enlarged side elevational view of a portion of the machine shown in FIGS. 1 and 2 and taken substantially along the line 7—7 of FIG. 2.

The tubular planting tool 65 is sized and shaped to receive and plant cartridge frames with plants growing therein such as the cartridge frame 35 shown in FIG. 7. As above noted, such cartridge frames are fully shown and described in the previously noted patent application of Bryant Edwards. For the purposes of the subject invention, it is sufficient to describe the cartridge frame 35 as comprising a bullet-shaped nose portion 73 depending from a base area 74. The base area 74 includes an annular shoulder of an outer diameter greater than the outer diameter of the planting tool 65. Extending upwardly from the base area 74 and radially within the annular shoulder, the cartridge 35 further comprises a plurality of spaced-apart ribs 75 which contain the root structure and growing medium of the seedling 76. Cartridges 35 used in the noted reduction to practice of the subject invention had a length indicated by the length of the line 77 in FIG. 7 of approximately 7½ inches and the outer diameter of the body portion of the cartridge 35 containing the root structure and growing medium of the plant 76 had an outer diameter of slightly 1 inch. The inner diameter of the planting tool 65 was slightly under 1 inch or, in other words, the inner diameter is such as to receive the body portion of the cartridge 35 there within and with the lowermost edge of the planting tool 65 in vertical abutment with the annular shoulder about the base area 74. A detent boss (not shown) in the tool 65 was used to frictionally retain the cartridge 35 therewithin. One side of the planting tool 65 toward the rearward end of the machine is provided with a slot 78. The slot 78 has a width greater than the stem diameter of the seedling 76 and a length substantially greater than the length of the body portion of the cartridge 35 so that the top growth of the seedling 76 can remain outwardly of the planting tool 65 substantially as shown in FIGS. 3 and 4.

Figure 8:
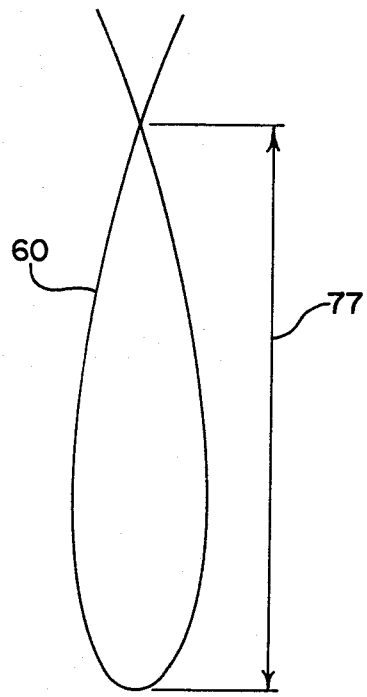
FIG. 8 is a diagram showing a portion of the prolate trochoid curve traced by the holder supporting member of the parallelogram of FIGS. 1-4 during the planting operation.

Returning to the portion of the prolate trochoid curve traced in the operation of the machine by a point on the member 40, and the curve 60 shown in FIG. 8, the dimension represented by the distances between the axes of the pin bearings 48 and 51 is preferably selected relative to the effective radius of the ground drive wheel 13 so that the closed loop of the curve 60 has a length approximating the length 77 as shown in FIGS. 7 and 8. Further, by appropriate vertical positioning of the planting tool 65 in the plant holder 43, the plant tool 65, if held against any movement along the member 40, will trace the closed loop of the curve 60 during the period that the planting tool 65, and the cartridge 35 carried therein, is inserted into the ground to a position as shown in FIG. 7. Those skilled in the art will appreciate that in consideration of the substantial planting depth, horizontal components of movement produced by the described planting mechanism are a minimum compared to comparable horizontal movements produced when the parallelogram traces a curve such as a cycloid curve. Of course, as described previously, the planting tool 65 is not held against movement longitudinally of member 40, but is permitted to be translated therealong by vitrue of the described rollers 62 of the plant holder 43. Thus, once the tip of planting tool 65 and cartridge 35 therein begins to enter the ground in the planting operation, the reaction of the ground against the planting tool 65 and tip of the cartridge 35 will cause substantially no horizontal component of movement of the planting tool 65 relative to the ground during the planting operation, and the plant holder 43 will oscillate along the member 40 the incremental distance represented by the width of the closed loop of the prolate trochoid curve 60. In addition to or in place of the tip of the cartridge 35 and the planting tool 65, a bar or spike (not shown) attached to and depending from the holder 43 may be used to prevent horizontal movement of the tool 65 relative to the ground while the plant is being vertically inserted in the ground and while the machine is moving along the ground. Those skilled in the art will understand that the upper end of the closed loop 60 need not be exactly at ground level, but that point may be either above the ground or below the ground a considerable distance and still not involve relative movement of the plant holder 43 along the member 40 for distances substantially greater than the maximum width of the closed loop of the prolate trochoid curve 60.

From the foregoing it may be seen that the described parallelogram arrangement of the three members 40, 41 and 42 and the described arrangement of the plant holder 43 cooperate to provide a planting mechanism that will insert a plant in a vertical direction a substantial depth into the ground and substantially absent of any horizontal component of movement of the plant relative to the ground as the machine is moving along the ground. The inclination of the member 40 produced by the spacer blocks 45 and 46 tends to prevent accidental movement of the plant holder 43 along the member 40 as the planting tool 65 begins to enter the ground. The curve 60 over the position represented by initial ground penetration of the planting tool 65 causes the planting holder 43 to move rearwardly of the member 40 from the normal center position, and it can be seen from FIG. 4 that a rearward movement of plant holder 43 along member 40 causes, by vitrue of the inclination of member 40 a further downward or anchoring component of force upon the planting tool 65.

The water tamping assembly 33 may be of any suitable known construction. In the embodiment shown, the assembly 33 comprises a pump and power source assembly 80 mounted on the forward end of a trailer 81. The trailer 81 further carries the water tank 82. The pump and power source 80 is connected to receive water from the tank 82 and to direct the water under sufficient pressure to and through the conduit 83. The conduit 83, as shown in FIG. 2, is connected to a water valve 84 and the water valve 84 is connected to a header 85. The water valve 84 may be of any known type that may be set to automatically remain open for a predetermined length of time after the water valve has been initially operated. The water valve 84 is mounted on the frame 10 of the machine at a position such that when the planting mechanism 16 withdraws the planting tool 65 from the ground upon completion of a planting operation, the rearward end of the member 40 will operate the valve 84. Normally the position of the member 40 for such operation of the valve 84 would be between the solid line and dotted line positions of the member 40 shown in FIG. 4.

The header 85 is also secured to the frame 10 of the machine and extends transversely of the machine. As shown in FIG. 7, the header 85 carries two water nozzles 86. The header 85 and water nozzles 86 are positioned and arranged in the machine so that when the water valve 84 is initially operated, water under pressure will issue from both nozzles 86 and will strike the ground on each side of the plant 76. The header 85 and water nozzles 86 are further positioned so that upon initial operation, the streams of water strike the ground ahead of the plant 76 and transverse lines on each side of the plant 76 aligned longitudinally of the machine as the machine moves along the ground. The predetermined time interval that the water valve 84 remains on is set to end after the water nozzles 86 have passed rearwardly of the plant 76. In the described arrangement, the water streams will wash soil on each side of the plant 76 into the small cylindrical opening that is left about the root area of the plant 76 after the planting tool 65 has been withdrawn to effectively water-tamp the plant.

It is believed that operation of the described embodiment is readily apparent from the foregoing description and need not further be described in substantial detail. Briefly, the machine is continuously drawn along the ground in the arrangement shown in FIGS. 1 and 2. The person 14 takes a cartridge 35 from the supply of cartridges carried on the tray 34, and strips the sleeve from the cartridge to expose the open frame and root area of the plant 76. Each time that the planting tool 65 is withdrawn from the ground from a position such as shown in solid lines in FIG. 4 to positions such as shown in dotted lines in FIG. 4 or in solid lines in FIG. 1, the operator 14 inserts a cartridge 35 into the planting tool 65 with top growth of the plant extending outwardly of the planting tool 65 through the slot 78 shown in FIG. 7. The cartridge is inserted into the planting tool 65 until the lower edge of the planting tool 65 abuts the annular shoulder on the base of the cartridge 35. As the machine is further moved along the ground, the ground drive wheel 13 will operate the planting mechanism 16 to carry the planting tool 65 for insertion of the plant into the ground. FIG. 3 shows the planting mechanism in a position where the planting tool 65 is approaching the ground in the planting operation.

Although not shown, those skilled in the art will understand that suitable weights may be mounted on the machine to insure that the machine provides sufficient reative forces for proper operation of the machine.

Having described the invention it is to be understood that changes can be made in the described preferred embodiment by one skilled in the art within the spirit and scope of the hereinafter following claims.

We claim:

1. In a planting machine, means for moving said machine along the ground, a mechanism for inserting an elongated container with a plant growing therein in a vertical direction a substantial depth into the ground and substantially absent any horizontal movement of the container and plant relative to the ground while said container and plant are held by said mechanism for inserting and the machine is moving along the ground, said mechanism comprising an elongated tubular plant holder formed to encircle and frictionally engage said elongated container to be inserted in the ground, rotatable members mounted in said machine for rotation about an axis substantially perpendicular to the direction of movement of the machine, movable means carrying said elongated tubular plant holder in a substantially vertical orientation on said rotatable members, said rotatable members inserting said container frictionally held therein into the ground in a substantially vertical direction and to a substantial depth responsive to the rotation of said rotatable members while the machine is moving along the ground, a ground drive wheel rotating responsive to movement of said machine along the ground, driving means connected between said ground drive wheel and said rotatable members for rotating said rotatable members responsive to rotation of said ground drive wheel, and said movable means normally carrying said plant holder on and with said rotatable members but permitting movement of said plant holder on and relative to said rotatable members in both directions along a line longitudinally of said machine and in the direction said machine moves along the ground when said plant holder engages the ground, said movable means being a resiliently biased roller carriage, said movable means preventing said rotatable means from moving said movable means relative to the ground along a line longitudinally of said machine while said rotatable members are inserting said tubular plant holder with said container and plant therein into the ground in a substantially vertical direction and to a substantial depth and while retracting said tubular plant holder out of the ground.

* * * * *